United States Patent Office 2,933,519
Patented Apr. 19, 1960

---

2,933,519
METHOD OF MANUFACTURING PHARMACODY-NAMICALLY EFFECTIVE BASIC ESTERS OF ALKOXY SUBSTITUTED MONO- AND DIPHENYL CARBAMIC ACIDS

Ales Sekera, Karel Palat, Alois Borovansky, and Jaroslav Sova, Brno, Czechoslovakia, assignors to Spafa, spojene farmaceuticke zavody, narodni podnik, Prague, Czechoslovakia No Drawing. Application May 31, 1957
Serial No. 662,575
Claims priority, application Czechoslovakia
June 11, 1956

9 Claims. (Cl. 260—472)

The local anesthetic action of basic esters of N,N-disubstituted carbamic acids was first published by K. Fromherz in Archiv für experimentale Pathologie und Pharmakologie, 76, 257, 1914; German Patent No. 272,529. These substances caused no particular sensation because of their comparatively low activity.

It has now been found that it is possible to obtain by appropriate substitution in compounds of this series a very high local anesthetic activity. The alkoxy derivatives of diphenyl carbamic acid esters with lower aliphatic amino alcohols particularly surpass the compounds known hitherto very greatly in both surface and infiltration anesthesia. Moreover, they are considerably less toxic and more tolerable in local application than known and commonly used anesthetics such as cocaine and novocaine. In addition, some of the new compounds of this series seem to possess a high degree of spasmolytic effectiveness.

The object of the present invention is a method of making the new compounds, which may be defined by the general formula

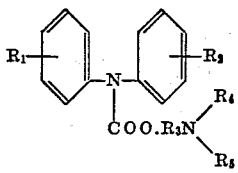

wherein $R_1$ signifies an alkoxy radical, $R_2$ an alkoxy radical or a hydrogen atom, $R_3$ an open or branched aliphatic chain with at most six carbon atoms; $R_4$ and $R_5$ are either hydrogen atoms or alkyl groups, which may be also mutually joined to form a heterocyclic ring, such as a piperidino or morpholino group.

The products may be used as free bases, or, if desired, in the form of their ammonium salts with mineral or organic acids.

The method of making said products consists in reacting derivatives of alkoxy- or dialkoxy carbamic acids of the general formula

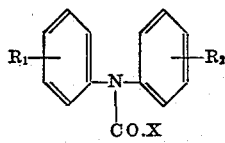

with basic compounds of the general formula

wherein X signifies a halogen atom, an alkoxy radical or $HO.R_3Hal$, and wherein Y is either hydrogen, $HO.R_3$ or $MeO.R_3$; wherein Hal is halogen and Me is an atom of an alkali metal, and wherein $R_4$ and $R_5$ are either hydrogen atoms or alkyl groups, which may be joined into a heterocyclic ring, other symbols having the same meaning as above.

Among monophenyl carbamic acid derivatives (carbanilic acid derivatives) there are most appropriate the compounds of the general formula

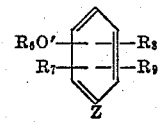

e.g.

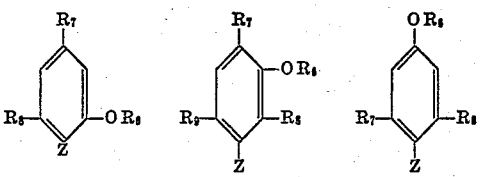

with basic compounds mentioned above, wherein Z signifies a radical selected from the group consisting of $-NCO$, $-NH.CO.Hal$, $-NH.COO.R_3H$
$-NH.COO.R_3Hal$ the remaining symbols having the same meaning as above. The products with only one aromatic nucleus possess the following structure:

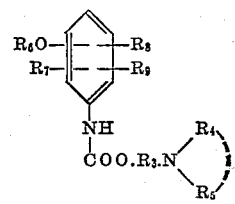

$R_6$ is a radical selected from the group consisting of cycloalkyl, aralkyl and aryl, and $R_7$, $R_8$, $R_9$ are either hydrogen atoms or alkyl radicals.

The condensation may be generally carried out by heating the components in a solution of an appropriate solvent such as toluene.

Example 1

The preparation of 4-ethoxy diphenyl carbamic acid ester of diethylamino ethanol. 11.5 g. of sodium are shaken in 600 cc. of boiling dry toluene. Then a hot solution of 59 g. of diethylamino ethanol in dry toluene is added in portions. The mixture is then heated under reflux until all the sodium is dissolved, humidity being excluded. Then a hot solution of 138 g. of 4-ethoxy diphenyl carbamic acid chloride in 500 cc. of dry toluene is added and the heating continued for one hour. The precipitated sodium chloride is separated by filtration and the solution is washed several times with water by shaking out. Then the base is extracted with diluted hydrochloric acid, the extract is made alkaline with sodium carbonate and extracted with ether. The ethereal layer is dried, ether distilled off and the base subjected to a fractionation in vacuo. Its boiling point is 185–190° C./5 mm. Hg.

The hydrochloride of the base may be easily prepared by mixing the dry ethereal solution wtih an equivalent of hydrogen chloride dissolved in dry ether. The hydrochloride melts at 146–147° C. (after a recrystallization from toluene).

Example 2

The preparation of 4-butoxy diphenyl carbamic ester of diethylamino ethanol: this substance may be obtained by reacting 59 g. of diethylamino ethanol with 152 g. of 4-butoxy diphenyl carbamic acid chloride in the manner described in Example 1. The base boils at 190–195° C./1 mm. Hg, its hydrochloride, recrystallized from a mixture of benzene with petroleum ether, melts at 106–107° C.

Example 3

Further basic esters of mono- and dialkoxylated diphenyl carbamic acids may be obtained in the same way, using corresponding components:

(a) 3-butoxy diphenyl carbamic ester of diethylamino ethanol; the base boils at 135° C./0.02 mm., its hydrochloride melts at 116–119° C. (recrystallized from a mixture of toluene-petroleum ether).

(b) 2-butoxy diphenyl carbamic acid ester of diethylamino ethanol. The base boils at 150° C./0.03 mm., its hydrochloride melts at 136° C. (recrystallized from toluene-petroleum ether).

(c) N,N-bis(4-ethoxy phenyl)-carbamic ester of diethylamino ethanol; the base boils at 180° C./0.3 mm., its hydrochloride melts, after having been recrystallized from toluene-petroleum ether, at 134–136° C.

(d) N,N-bis(4-butoxy phenyl)-carbamic acid ester of diethylamino ethanol; its hydrochloride melts, recrystallized from toluene-petroleum ether, at 109–115° C.

(e) N,N-bis(3-butoxy phenyl)-carbamic ester of diethylamino ethanol. The hydrochloride melts, recrystallized from toluene-petroleum ether, at 97–98° C.

Example 4

The preparation of 4-phenoxycarbanilic acid ester of diethylamino ethanol: 211 g. of p-phenoxy phenyl isocyanate are dissolved in 1000 cc. of dry toluene and the hot solution is added in portions to a boiling solution of 117 g. of dry, freshly redistilled diethylamino ethanol in 1500 cc. of dry toluene. After having been boiled for an hour the reaction mixture is left standing for 12 hours. Then 20 cc. of water are added and the whole is shaken vigorously. After an additional 24 hours the mixture is washed several times with water until alkaline reaction disappears. The basic ester is then extracted with diluted hydrochloric acid, the extract is made alkaline with sodium carbonate and the aqueous solution is again extracted with ether. The hydrochloride of the desired base may be directly precipitated from the dried ethereal solution by adding an equivalent of hydrogen chloride in a dry ethereal solution. The hydrochloride melts, after having been recrystallized from toluene, at 136–137° C.

Example 5

The preparation of m-benzyloxy carbanilic acid ester of diethylamino ethanol: this substance may be obtained in the manner described in Example 4 by reacting 117 g. of diethylamino ethanol with 227 g. of m-benzyloxy phenylisocyanate. After a recrystallization from an ethanol-ether mixture the corresponding hydrochloride melts at 127–128° C.

Example 6

Further basic esters of this series may be obtained in the same way:

(a) Ester of diethylamino ethyl alcohol with o-phenylethoxy carbanilic acid forms a yellowish liquid with $n_D^{20}=1.5464$.

(b) Ester of diethylamino ethanol with m-phenylethoxy carbanilic acid: its hydrochloride melts, after having been recrystallized from acetone, at 119° C.

(c) Ester of diethylamino ethanol with p-phenylethoxy carbanilic acid. The hydrochloride melts at 152° C. (recrystallized from acetone-ether).

(d) Ester of diethylamino ethanol with o-benzyloxy carbanilic acid: its hydrochloride melts at 104–105° C. (recrystallized from ethanol-ether).

(e) Ester of diethylamino ethanol with p-benzyloxy carbanilic acid: its hydrochloride melts at 130–131° C. (recrystallized from ethanol-ether).

(f) Ester of diethylamino ethanol with o-phenoxy carbanilic acid. The hydrochloride melts at 174–175° C. (recrystallized from acetone).

(g) Ester of diethylamino ethanol with m-phenoxy carbanilic acid. The hydrochloride melts at 132° C. (recrystallized from ethanol-ether).

The substituted carbamic acid chlorides used in examples 1–3 may be prepared in a manner known per se by reacting substituted amines with phosgene. In a similar manner the substituted phenyl isocyanates used in Examples 4–6 may be prepared from primary aromatic substituted amines and phosgene.

New derivatives prepared according to this invention are very effective and possess very favorable therapeutic indices. Thus, for example, 3-butoxy diphenyl carbamate of diethylamino ethanol (hydrochloride) is in surface anesthesia 76 times and in infiltration anesthesia 11 times more effective than cocaine, and its LD50 is (subcutaneously) 270 mg./kg. as compared to 125 mg./kg. for cocaine.

The 4-butoxy derivative is in surface anesthesia 53 times in infiltration anesthesia 14.5 times more effective than novocaine, while its toxicity is about 20 percent lower. The same butoxy derivative is about 4 times more efficient in infiltration anesthesia than cocaine, which, however, is 5 times more toxic.

We claim:

1. A compound selected from the group consisting of compounds having the following structural formula:

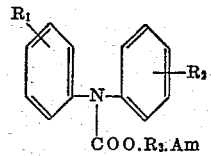

wherein $R_1$ is a lower alkoxy radical, $R_2$ is selected from the group consisting of hydrogen and lower alkoxy radicals, $R_3$ is an ethylene group, and Am is selected from the group consisting of the diethylamino radical, the piperidino radical, and the morpholino radical; and acid addition salts thereof.

2. A compound having the following general formula:

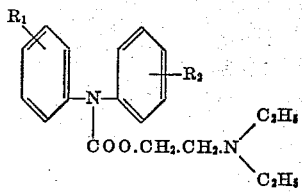

wherein $R_1$ is a lower alkoxy radical, and $R_2$ is a lower alkoxy radical.

3. 4-ethoxy diphenyl carbamic acid ester of diethylamino ethanol.

4. 4-ethoxy diphenyl carbamic acid ester of diethylamino ethanol hydrochloride.

5. 4-butoxy diphenyl carbamic acid ester of diethylamino ethanol.

6. 4-butoxy diphenyl carbamic acid ester of diethylamino ethanol hydrochloride.

7. 3-butoxy diphenyl carbamic acid ester of diethylamino ethanol.

8. 2-butoxy diphenyl carbamic acid ester of diethylamino ethanol.

9. 3-butoxy diphenyl carbamic acid ester of diethylamino ethanol hydrochloride.

References Cited in the file of this patent

UNITED STATES PATENTS

| | | |
|---|---|---|
| 2,104,753 | Major et al. | Jan. 11, 1938 |
| 2,109,492 | Lott et al. | Mar. 1, 1938 |
| 2,409,001 | Shelton et al. | Oct. 8, 1946 |
| 2,772,289 | Cusic | Nov. 27, 1956 |

OTHER REFERENCES

Hutton: J. Org. Chem., 20, 855 to 859 (1955).

UNITED STATES PATENT OFFICE

CERTIFICATE OF CORRECTION

Patent No. 2,933,519 April 19, 1960

Ales Sekera et al.

It is hereby certified that error appears in the above numbered patent requiring correction and that the said Letters Patent should read as corrected below.

In the grant, lines 2 and 12, and in the heading to the printed specification, line 7, for "Spafa", each occurrence, read -- Spofa --.

Signed and sealed this 25th day of October 1960.

(SEAL)
Attest:

KARL H. AXLINE
Attesting Officer

ROBERT C. WATSON
Commissioner of Patents